United States Patent
Suzuki et al.

(10) Patent No.: US 7,411,725 B2
(45) Date of Patent: Aug. 12, 2008

(54) OPTICAL SIGNAL DEMODULATOR

(75) Inventors: Yasuyuki Suzuki, Tokyo (JP); Yoshihiro Sanpei, Tokyo (JP); Morio Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/605,451

(22) Filed: Nov. 29, 2006

(65) Prior Publication Data

US 2007/0140695 A1 Jun. 21, 2007

(30) Foreign Application Priority Data

Nov. 30, 2005 (JP) .......................... P. 2005-346011

(51) Int. Cl.
*G02F 2/00* (2006.01)
*H04B 10/00* (2006.01)

(52) U.S. Cl. ....................... 359/325; 398/140; 398/161; 398/188; 398/212

(58) Field of Classification Search ........................ None
See application file for complete search history.

(56) References Cited

U.S. PATENT DOCUMENTS

2007/0070505 A1* 3/2007 Hsieh .......................... 359/578

2007/0081826 A1* 4/2007 Liu ............................. 398/188

FOREIGN PATENT DOCUMENTS

JP 2004-516743 A 6/2004
WO WO 02/51041 A2 6/2002

* cited by examiner

*Primary Examiner*—Hemang Sanghavi
(74) *Attorney, Agent, or Firm*—Sughrue Mion, PLLC

(57) ABSTRACT

A demodulator includes: a Michelson interferometer having: a half-mirror which splits an optical signal, emits a first split light to a first optical path, and emits a second split light to a second optical path; a first reflector which reflects the first split light to the half-mirror; and a second reflector which reflects the second split light to the half-mirror, wherein the half-mirror recombines the first split light and the second split light, and emits a recombined optical signal while splitting the recombined optical signal; and an balanced optical detector which receives the recombined optical signals from the Michelson interferometer, and generates a demodulated signal based on the two recombined optical signals. The length difference between the first optical path and the second optical path is set so that the second split light has a delay time equal to a one-bit period, with respect to the first split light.

27 Claims, 4 Drawing Sheets

OPTICAL SIGNAL DEMODULATOR

This application claims foreign priority based on Japanese Patent application No. 2005-346011, filed Nov. 30, 2005, the content of which is incorporated herein by reference in its entirety.

BACKGROUND OF THE INVENTION

1. Field of the Invention

The present invention relates to a demodulator for a differential phase shift keying signal in optical fiber communication, particularly optical fiber communication using DWDM (Dense Wavelength Division Multiplexing).

2. Description of the Related Art

Recently, in order to accommodate requests for a higher speed and larger capacity of a network in accordance with rapid development of the Internet, optical fiber communication in which information is transmitted not in the form of an electric signal but in the form of an optical signal that uses an optical fiber as a transmission path has been developed and put to practical use. In such optical fiber communication, in order to realize a higher speed and a larger capacity, attention is given to DWDM (Dense Wavelength Division Multiplexing) in which plural optical signals of different wavelengths are recombined and transmitted through one optical fiber by using the property of light that "light beams of different wavelengths do not interfere with each other".

In optical fiber communication in which DWDM is used, an optical signal which is modulated by DPSK (Differential Phase Shift Keying) or DQPSK (Differential Quadrature Phase Shift Keying) is mainly transmitted, and a received optical signal is demodulated by a demodulator comprising a delay interferometer.

For example, JP-T-2004-516743 discloses a demodulator which demodulates a DQPSK-modulated optical signal in optical fiber communication in which DWDM is used. FIG. 4 is a block diagram of the configuration of the demodulator.

As shown in FIG. 4, the related demodulator 60 is configured by: a first branch path 61 and a second branch path 62 which are formed by an optical fiber; a first Mach-Zehnder interferometer 63 and a second Mach-Zehnder interferometer 64 which are of the optical waveguide type; a first balanced optical detector 65; and a second balanced optical detector 66.

The first optical fiber 61 splits a DQPSK-modulated optical signal (hereinafter, referred to as DQPSK optical signal) transmitted from an optical fiber F, and transmits a split signal to the first Mach-Zehnder interferometer 63. The second branch path 62 splits the DQPSK optical signal transmitted from the optical fiber F, and transmits a split signal to the second Mach-Zehnder interferometer 64.

The first Mach-Zehnder interferometer 63 is configured by a first optical waveguide 63a, a second optical waveguide 63b, a third optical waveguide 63d, and a fourth optical waveguide 63e. The first optical waveguide 63a has an optical path length which is longer by $\Delta L1$ than that of the second optical waveguide 63b, the DQPSK optical signal transmitted from the first optical fiber 61 is split, and a split signal is transmitted to the third optical waveguide 63d. The second optical waveguide 63b has a predetermined optical path length, the DQPSK optical signal transmitted from the first optical fiber 61 is split, and a split signal transmitted to the fourth optical waveguide 63e.

The optical path length difference $\Delta L1$ between the first optical waveguide 63a and the second optical waveguide 63b is set so that the DQPSK optical signal transmitted through the first optical waveguide 63a has a delay time which is equal to one period of the modulation rate, i.e., a symbol period with respect to that the DQPSK optical signal transmitted through the second optical waveguide 63b. A predetermined voltage is applied by a voltage applying apparatus (not shown) to give a phase shift of $\pi/4$ to the DQPSK optical signal transmitted through the second optical waveguide 63b.

The DQPSK optical signals transmitted from the first optical waveguide 63a and the second optical waveguide 63b are recombined, and transmitted as a first recombined optical signal to the third optical waveguide 63d and the fourth optical waveguide 63e. The third optical waveguide 63d transmits the first recombined optical signal transmitted from the first optical waveguide 63a, and emits the signal toward a first light receiving element 65a of the first balanced optical detector 65. The fourth optical waveguide 63e transmits the first recombined optical signal transmitted from the second optical waveguide 63b, and emits the signal toward a second light receiving element 65b of the first balanced optical detector 65. The third optical waveguide 63d and the fourth optical waveguide 63e are configured so as to have the same optical path length.

The second Mach-Zehnder interferometer 64 is configured by a first optical waveguide 64a, a second optical waveguide 64b, a third optical waveguide 64d, and a fourth optical waveguide 64e. The first optical waveguide 64a has an optical path length which is longer by $\Delta L1$ than that of the second optical waveguide 64b, the DQPSK optical signal transmitted from the second optical fiber 62 is split, and a split signal is transmitted to the third optical waveguide 64d. The second optical waveguide 64b has a predetermined optical path length, the DQPSK optical signal transmitted from the second optical fiber 62 is split, and a split signal is transmitted to the fourth optical waveguide 64e.

Similarly in the first Mach-Zehnder interferometer 63, the optical path length difference $\Delta L1$ between the first optical waveguide 64a and the second optical waveguide 64b is set so that the DQPSK optical signal transmitted through the first optical waveguide 64a has a delay time which is equal to a symbol period with respect to that the DQPSK optical signal transmitted through the second optical waveguide 64b. A predetermined voltage is applied by the voltage applying apparatus (not shown) to give a phase shift of $-\pi/4$ to the DQPSK optical signal transmitted through the second optical waveguide 64b.

The DQPSK optical signals transmitted from the first optical waveguide 64a and the second optical waveguide 64b are recombined, and transmitted as a second recombined optical signal to the third optical waveguide 64d and the fourth optical waveguide 64e. The third optical waveguide 64d transmits the second recombined optical signal transmitted from the first optical waveguide 64a, and emits the signal toward a first light receiving element 66a of the second balanced optical detector 66. The fourth optical waveguide 64e transmits the second recombined optical signal transmitted from the second optical waveguide 64b, and emits the signal toward a second light receiving element 66b of the second balanced optical detector 66. The third optical waveguide 64d and the fourth optical waveguide 64e are configured so as to have the same optical path length.

The first balanced optical detector 65 comprises the first light receiving element 65a and second light receiving element 65b which output an electric signal in accordance with the light intensity of the first recombined optical signal. Electric signals output from the first and second light receiving element 65a, 65b are subjected to an balancing process to output a first demodulated signal x. The second balanced optical detector 66 comprises the first light receiving element 66a and second light receiving element 66b which output an electric signal in accordance with the light intensity of the second recombined optical signal. Electric signals output from the first and second light receiving element 66a, 66b are subjected to an balancing process to output a second demodulated signal y.

As described above, the demodulator comprises: the first Mach-Zehnder interferometer 63 having the two optical waveguides which apply the delay time that is equal to the symbol period, and the phase shift of $\pi/4$ to the DQPSK optical signal; and the second Mach-Zehnder interferometer 64 having the two optical waveguides which apply the delay time that is equal to the symbol period, and the phase shift of $-\pi/4$ to the DQPSK optical signal. Therefore, the obtained first and second demodulated signals x, y are signals indicative of a binary code.

A demodulator which demodulates a DPSK-modulated optical signal is requested to comprise one Mach-Zehnder interferometer. That is, such a demodulator is configured only by, shown in FIG. 4, the first branch path 61, the first Mach-Zehnder interferometer 63, and the first balanced optical detector 65. In this case, in the first Mach-Zehnder interferometer 63, it is not necessary to give the phase shift to the DPSK-modulated optical signal transmitted through the second optical waveguide 63b.

As described above, in the related demodulator, a Mach-Zehnder interferometer of the optical waveguide type is used. Consequently, there arise the following problems.
(1) In order to stabilize characteristics of optical waveguides, a highly accurate temperature control is required. This makes the apparatus cost to be increased, and the apparatus size to be enlarged.
(2) Optical waveguides are easily affected by mechanical stress, and characteristics of optical waveguides are dispersed.
(3) Although not illustrated in FIG. 4, usually, a Mach-Zehnder interferometer is connected to an balanced optical detector by an optical fiber. Therefore, an optical signal transmitted from the Mach-Zehnder interferometer is delayed by the optical fiber.
(4) It is difficult to ensure the reproducibility of the $\pm\pi/4$-phase shift process on a DQPSK optical signal.

Because of the problems, the related demodulator cannot perform stable and correct demodulation.

SUMMARY OF THE INVENTION

The present invention has been made in view of the above circumstances, and provides a demodulator which demodulates stably and correctly a DQPSK-modulated or DPSK-modulated optical signal.

In some implementations, a demodulator of the invention for demodulating an optical signal on which DPSK (Differential Phase Shift Keying) is applied, the demodulator comprising:
a Michelson interferometer that includes:
a half-mirror for splitting the optical signal into a first split light and a second split light, emitting the first split light to a first optical path, and emitting the second split light to a second optical path;
a first reflector for reflecting the first split light to the half-mirror, the first reflector being disposed on the first optical path; and
a second reflector for reflecting the second split light to the half-mirror, the second reflector being disposed on the second optical path,
wherein the half-mirror recombines the first split light incident from the first reflector and the second split light incident from the second reflector, and emits a recombined optical signal while splitting the recombined optical signal in two branches, and
an balanced optical detector that includes:
two light receiving elements for receiving the recombined optical signals being emitted in two branches from the Michelson interferometer,
wherein the balanced optical detector generates a demodulated signal based on the recombined optical signals,
wherein an optical path length difference between the first optical path and the second optical path is set so that the second split light has a delay time which is equal to a one-bit period of the optical signal, with respect to the first split light.

In the demodulator, at least one of the first reflector or the second reflector has a movable mechanism to adjust an optical path length of at least one of the first optical path or the second optical path.

In the demodulator, the Michelson interferometer further includes a phase adjusting section for adjusting the delay time, the phase adjusting section being disposed between the half-mirror and at least one of the first reflector or the second reflector.

In some implementations, a demodulator of the invention for demodulating an optical signal on which a DQPSK (Differential Quadrature Phase Shift Keying) is applied, the demodulator comprising:
a Michelson interferometer that includes:
a splitting section for splitting the optical signal into a first split light and a second split light, and emitting the first split light and the second split light;
a half-mirror which is disposed on an emission optical axis of the splitting section, the half-mirror for splitting the first split light into a third split light and a fourth split light, emitting the third split light to a first optical path, emitting the fourth split light to a second optical path, splitting the second split light into a fifth split light and a sixth split light, emitting the fifth split light to a third optical path, and emitting the sixth split light to a fourth optical path;
a first reflector for reflecting the third split light and the fifth split light to the half-mirror, the first reflector being disposed on the first optical path and the third optical path; and
a second reflector for reflecting the fourth split light and the sixth split light to the half-mirror, the second reflector being disposed on the second optical path and the fourth optical path,
wherein the half-mirror recombines the third split light incident from the first reflector and the fourth split light incident from the second reflector, and emits a first recombined optical signal while splitting the first recombined optical signal in two branches, and
the half-mirror recombines the fifth split light incident from the first reflector and the sixth split light incident from the second reflector, and emits a second recombined optical signal while splitting the second recombined optical signal in two branches;
a first balanced optical detector that includes:
two light receiving elements for receiving the first recombined optical signals being emitted in two branches from the Michelson interferometer,
wherein the first balanced optical detector generates a first demodulated signal based on the first recombined optical signals; and a second balanced optical detector that includes:
two light receiving elements for receiving the second recombined optical signals being emitted in two branches from the Michelson interferometer,
wherein the second balanced optical detector generates a second demodulated signal based on the second recombined optical signals,
wherein an optical path length difference between the first optical path and the second optical path is set so that the fourth split light has a delay time which is equal to a symbol period of the optical signal, with respect to the third split light,
an optical path length difference between the third optical path and the fourth optical path is set so that the sixth split light has a delay time which is equal to a symbol period of the optical signal, with respect to the fifth split light, and
the Michelson interferometer further includes a phase adjusting section for setting a phase difference between the first recombined optical signal and the second recombined optical signal to $\pi/2$, the phase adjusting section being disposed between the half-mirror and at least one of the first reflector or the second reflector.

In some implementations, a demodulator of the invention for demodulating an optical signal on which a DQPSK (Differential Quadrature Phase Shift Keying) is applied, the demodulator comprising:
a Michelson interferometer that includes:
a half-mirror for splitting the optical signal into a first split light and a second split light;
a first reflector for reflecting the first split light to the half-mirror while splitting the first split light into a third split light and a fourth split light; and
a second reflector for reflecting the second split light into the half-mirror while splitting the second split light into a fifth split light and a sixth split light,
wherein the half-mirror recombines the third split light incident from the first reflector and the fifth split light incident from the second reflector, and emits a first recombined optical signal while splitting the first recombined optical signal in two branches, and
the half-mirror recombines the fourth split light incident from the first reflector and the sixth split light incident from the second reflector, and emits a second recombined optical signal while splitting the second recombined optical signal in two branches;
a first balanced optical detector that includes:
two light receiving elements for receiving the first recombined optical signals being emitted in two branches from the Michelson interferometer,
wherein the first balanced optical detector generates a first demodulated signal based on the first recombined optical signals; and
a second balanced optical detector that includes:
two light receiving elements for receiving the second recombined optical signals being emitted in two branches from the Michelson interferometer,
wherein the second balanced optical detector generates a second demodulated signal based on the second recombined optical signals,
wherein an optical path length difference between a first optical path through which the first split light and the third split light pass and a second optical path through which the second split light and the fifth split light pass is set so that the fifth split light has a delay time which is equal to a symbol period of the optical signal, with respect to the third split light,
an optical path length difference between a third optical path through which the first split light and the fourth split light pass and a fourth optical path through which the second split light and the sixth split light pass is set so that the sixth split light has a delay time which is equal to a symbol period of the optical signal, with respect to the fourth split light, and
the Michelson interferometer further includes a phase adjusting section for setting a phase difference between the first recombined optical signal and the second recombined optical signal to $\pi/2$, the phase adjusting section being disposed between the half-mirror and at least one of the first reflector or the second reflector.

In the demodulator, at least one of the first reflector or the second reflector has a movable mechanism to adjust an optical path length of any one of the first to fourth optical paths.

In the demodulator, the phase adjusting section is a combination of two media having different refractive indices, a combination of two media having different board thicknesses, or a combination of two optical thin films having different optical characteristics.

In the demodulator, the phase adjusting section is an optically transparent medium in which a refractive index changes by applying an external force. In the demodulator, the external force is a stress, an electric field, or a temperature.

In the demodulator, the Michelson interferometer and the balanced optical detector are connected by an optical fiber.

In the demodulator, at least one of the Michelson interferometer and the first balanced optical detector, or the Michelson interferometer and the second balanced optical detector are connected by an optical fiber.

According to the invention, a demodulator is not configured by a Mach-Zehnder interferometer of the optical waveguide type as in the related art, but by a Michelson interferometer having optical components. Therefore, it is possible to provide a demodulator which demodulates stably and correctly a DQPSK-modulated or DPSK-modulated optical signal.

DESCRIPTION OF THE PREFERRED EMBODIMENTS

First Embodiment

Figure 1:
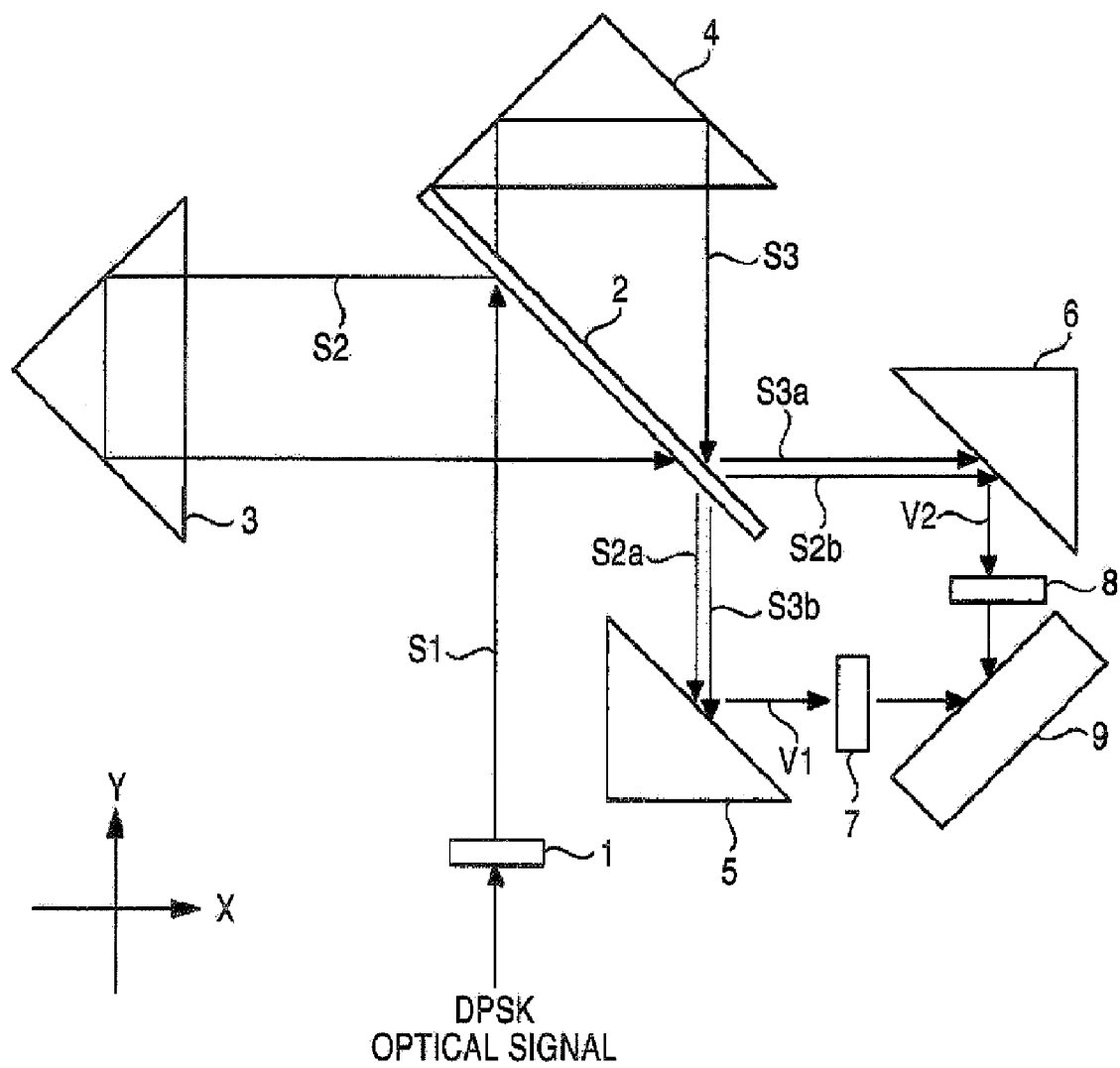
FIG. 1 is a diagram schematically showing the configuration of a demodulator of a first embodiment.

Hereinafter, a first embodiment of the invention will be described with reference to the accompanying drawings. FIG. 1 is a diagram schematically showing the configuration of a demodulator of the first embodiment. The demodulator of the first embodiment demodulates a DPSK-modulated optical signal (DPSK optical signal).

As shown in the figure, the demodulator of the first embodiment is configured by a first lens 1, a half mirror 2, a first reflector 3, a second reflector 4, a first mirror 5, a second mirror 6, a second lens 7, a third lens 8, and an balanced optical detector 9. Among the constituent components, the first lens 1, the half-mirror 2, the first reflector 3, the second reflector 4, the first mirror 5, the second mirror 6, the second lens 7, and the third lens 8 constitute a Michelson interferometer.

The first lens 1 is, for example, a collimator lens, coverts a DPSK optical signal which is incident from an optical fiber (not shown) into parallel light S1, and emits the parallel light to the half-mirror 2 disposed on the emission axis (Y-axis). The half-mirror 2 reflects the parallel light S1 incident from the first lens 1, as first reflected light S2 to the first reflector 3 disposed in the X-axis direction, and allows the light to transmit as first transmitted light S3 to the second reflector 4 disposed in the Y-axis direction.

The first reflector 3 reflects the first reflected light S2 incident from the half-mirror 2, in the Y-axis direction, and then reflects the light in the X-axis direction, or toward the half-mirror 2. The first reflector 3 is disposed so as to be movable in the X-axis direction. The second reflector 4 reflects the first transmitted light S3 incident from the half-mirror 2, in the X-axis direction, and then reflects the light toward the half-mirror 2.

The half-mirror 2 reflects the first reflected light S2 incident via the first reflector 3, as second reflected light S2a to the first mirror 5 disposed in the Y-axis direction, and allows the light to transmit as second transmitted light S2b to the second mirror 6 disposed in the X-axis direction. The half-mirror 2 reflects the first transmitted light S3 incident via the second reflector 4, as third reflected light S3a to the second mirror 6, and allows the light to transmit as third transmitted light S3b to the first mirror 5.

That is, in the half-mirror 2, the second reflected light S2a and the third transmitted light S3b are recombined, and then emitted to the first mirror 5, and the second transmitted light S2b and the third reflected light S3a are recombined, and then emitted to the second mirror 6. The optical path length difference between the first reflected light S2 and the first transmitted light S3 is set so that the first reflected light S2 has a delay time which is equal to a one-bit period, with respect to the first transmitted light S3.

The first mirror 5 reflects the second reflected light S2a and third transmitted light S3b which are recombined, to the second lens 7 disposed in the X-axis direction. The second mirror 6 reflects the second transmitted light S2b and third reflected light S3a which are recombined, to the third lens 8 disposed in the Y-axis direction.

The second lens 7 is a condensing lens, collects the recombined light (first recombined light V1) of the second reflected light S2a and the third transmitted light S3b incident from the first mirror 5, and emits the collected light to the balanced optical detector 9. The third lens 8 is a condensing lens, collects the recombined light (second recombined light V2) of the second transmitted light S2b and the third reflected light S3a incident from the second mirror 6, and emits the collected light to the balanced optical detector 9. The balanced optical detector 9 comprises: a first light receiving element which outputs an electric signal in accordance with the light intensity of the first recombined light; and a second light receiving element which outputs an electric signal in accordance with the light intensity of the second recombined light (the light receiving elements are not shown), detects equilibrium on the basis of the electric signals output from the light receiving elements, and generates a demodulated signal.

Next, the operation of the thus configured demodulator of the first embodiment will be described.

The DPSK optical signal incident from the optical fiber is converted by the first lens 1 to the parallel light S1, and emitted to the half-mirror 2. The parallel light S1 is split by the half-mirror 2 into the first reflected light S2 and the first transmitted light S3. The first reflected light S2 is emitted to the first reflector 3, and the first transmitted light S3 is emitted to the second reflector 4.

The first reflected light S2 is again incident on the half-mirror 2 via the first reflector 3, and the first transmitted light S3 is again incident on the half-mirror 2 via the second reflector 4. At this time, the first reflected light S2 has the delay time Td which is equal to a one-bit period, with respect to the first transmitted light S3.

The first reflected light S2 incident via the first reflector 3 is split by the half-mirror 2 into the second reflected light S2a and the second transmitted light S2b. The second reflected light S2a is emitted to the first mirror 5, and the second transmitted light S2b is emitted to the second mirror 6. By contrast, the first transmitted light S3 incident via the second reflector 4 is split by the half-mirror 2 into the third reflected light S3a and the third transmitted light S3b. The third reflected light S3a is emitted to the second mirror 6, and the third transmitted light S3b is emitted to the first mirror 5.

That is, the recombined light (first recombined light V1) of the second reflected light S2a and the third transmitted light S3b is incident on the first mirror 5, and the recombined light (second recombined light V2) of the second transmitted light S2b and the third reflected light S3a is incident on the second mirror 6.

The first recombined light V1 is emitted to the second lens 7 via the first mirror 5, collected by the second lens 7, and then emitted to the balanced optical detector 9. The second recombined light V2 is emitted to the third lens 8 via the second mirror 6, collected by the third lens 8, and then emitted to the balanced optical detector 9. The balanced optical detector 9 performs an equilibrium detecting process on the first recombined light V1 and the second recombined light V2, and generates the demodulated signal.

The light intensity P1 of the first recombined light V1 and the light intensity P2 of the second recombined light V2 are expressed by following expressions (1) and (2).

[Exp. 1]

$$P1 = \left|\frac{1}{2}\left(e^{-j2\pi f\left(T_d+\frac{\delta_1}{c}\right)} + e^{j0}\right)\right|^2 = \left|\frac{1}{2}\left(e^{-j2\pi f\left(T_d+\frac{\delta_1}{c}\right)} + 1\right)\right|^2 \quad (1)$$

$$P2 = \left|\frac{1}{2}\left(e^{-j2\pi f\left(T_d+\frac{\delta_1}{c}\right)} - e^{j0}\right)\right|^2 = \left|\frac{1}{2}\left(e^{-j2\pi f\left(T_d+\frac{\delta_1}{c}\right)} - 1\right)\right|^2 \quad (2)$$

In the expressions (1) and (2), Td is the delay time (one-bit period), f is the carrier frequency, and c is the speed of light. Furthermore, δ1 is a parameter indicating a phase adjusting amount of the Michelson interferometer. This parameter is used for correcting a change of the carrier frequency and the like, and can be interpreted as a fine adjustment of the delay time Td. The parameter δ1 can be adjusted by moving the first reflector 3 in the X-axis direction.

As described above, the demodulator of the first embodiment is not configured by optical waveguides as in the related art, but by the Michelson interferometer having the discrete optical components. A temperature compensating structure of the delay time Td can be easily obtained by finely adjusting the X-axis direction position of the first reflector 3, and it is possible to realize a demodulator in which a highly accurate temperature control is not required. Since the temperature control is not required, the apparatus cost and size of the demodulator can be reduced.

When the Michelson interferometer and the balanced optical detector 9 are not connected to each other by an optical fiber unlike the related art, and the optical signals (the first recombined light V1 and the second recombined light V2)

output from the Michelson interferometer are received directly by the balanced optical detector 9, a delay is not generated in the optical signals. In this way, according to the demodulator of the first embodiment, a DPSK optical signal can be demodulated stably and correctly.

Second Embodiment

Figure 2:
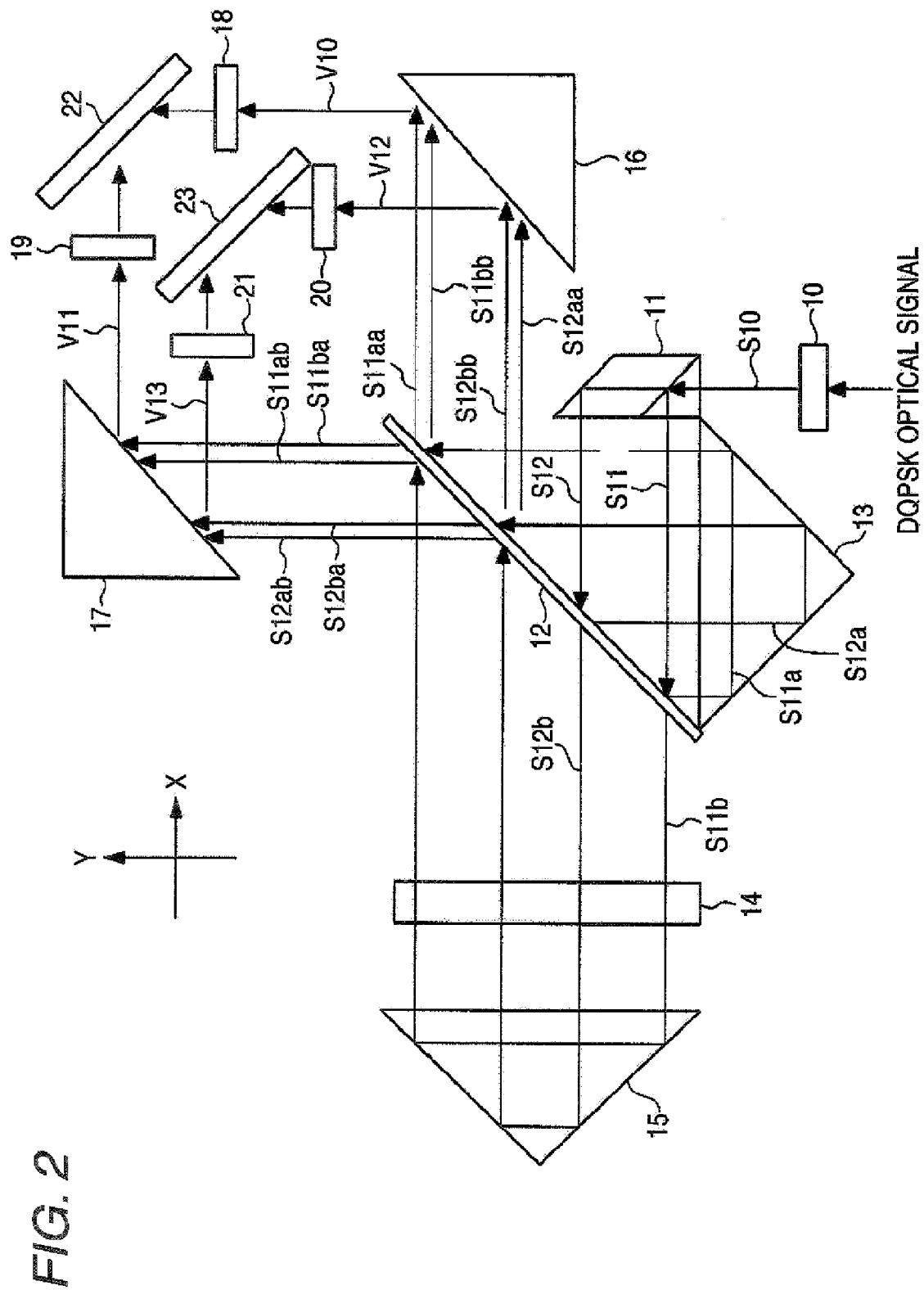
FIG. 2 is a diagram schematically showing the configuration of a demodulator of a second embodiment.

Next, a second embodiment of the invention will be described with reference to FIG. 2. FIG. 2 is a diagram schematically showing the configuration of a demodulator of the second embodiment. The demodulator of the second embodiment demodulates a DQPSK-modulated optical signal (DQPSK optical signal).

As shown in the figure, the demodulator of the second embodiment is configured by a first lens 10, a two-split prism 11, a half-mirror 12, a first reflector 13, a phase adjusting section 14, a second reflector 15, a first mirror 16, a second mirror 17, a second lens 18, a third lens 19, a fourth lens 20, a fifth lens 21, a first balanced optical detector 22, and a second balanced optical detector 23.

The first lens 10 is, for example, a collimator lens, coverts a DQPSK optical signal which is incident from an optical fiber (not shown) into parallel light S10, and emits the parallel light to the two-split prism 11 disposed on the emission axis (Y-axis). The two-split prism 11 splits the parallel light S10 incident from the first lens 10, emits one split light as first split light S11 to the half-mirror 12 disposed in the X-axis direction, and emits the other split light as second split light S12 to the half-mirror 12.

The half-mirror 12 reflects the first split light S11 incident from the two-split prism 11, as first reflected light S11a to the first reflector 13 disposed in the Y-axis direction, and allows the light to transmit as first transmitted light S11b to the second reflector 15 via the phase adjusting section 14 disposed in the X-axis direction. The half-mirror 12 reflects the second split light S12 incident from the two-split prism 11, as second reflected light S12a to the first reflector 13, and allows the light to transmit as second transmitted light S12b to the second reflector 15 via the phase adjusting section 14.

The first reflector 13 reflects the first reflected light S11a and the second reflected light S12a incident from the half-mirror 12, in the X-axis direction, and then reflects the light in the Y-axis direction, or toward the half-mirror 12. The second reflector 15 reflects the first transmitted light S11b and the second transmitted light S12b incident from the half-mirror 12, in the Y-axis direction, and then reflects the light in the X-axis direction, or toward the half-mirror 12. The second reflector 15 is disposed so as to be movable in the X-axis direction.

The optical path length difference between the first reflected light S11a and the first transmitted light S11b is set so that the first transmitted light S11b has a delay time Td which is equal to a symbol period, with respect to the first reflected light S11a. Similarly, the optical path length difference between the second reflected light S12a and the second transmitted light S12b is set so that the second transmitted light S12b has a delay time Td which is equal to a symbol period, with respect to the second reflected light S12a.

The phase adjusting section 14 gives a phase shift of $\pi/4$ to the first transmitted light S11b, and a phase shift of $-\pi/4$ to the second transmitted light S12b. That is, a phase difference of $\pi/2$ is provided between the first transmitted light S11b and the second transmitted light S12b. Specifically, a combination of two optical media having different refractive indices, that of two optical media having different thicknesses, or that of two optical thin films having different optical characteristics, or the like is used as the phase adjusting section 14, thereby realizing the phase shift. The phase adjusting section 14 finely adjusts the phase shift amount by applying any external force such as stress, an electric field, or a temperature.

The half-mirror 12 reflects the first reflected light S11a incident via the first reflector 13, as third reflected light S11aa to the first mirror 16 disposed in the X-axis direction, and allows the light to transmit as third transmitted light S11ab to the second mirror 17 disposed in the Y-axis direction. The half-mirror 12 reflects the second transmitted light S12a incident via the first reflector 13, as fourth reflected light S12aa to the first mirror 16, and allows the light to transmit as fourth transmitted light S12ab to the second mirror 17.

The half-mirror 12 reflects the first transmitted light S11b incident via the second reflector 15, as fifth reflected light S11ba to the second mirror 17, and allows the light to transmit as fifth transmitted light S11bb to the first mirror 16. The half-mirror 12 reflects the second transmitted light S12b incident via the second reflector 15, as sixth reflected light S12ba to the second mirror 17, and allows the light to transmit as sixth transmitted light S12bb to the first mirror.

That is, in the half-mirror 12, the third reflected light S11aa and the fifth transmitted light S11bb are recombined (first recombined light V10), and then emitted to the first mirror 16, the third transmitted light S11ab and the fifth reflected light S11ba are recombined (second recombined light V11), and then emitted to the second mirror 17, the fourth reflected light S12aa and the sixth transmitted light S12bb are recombined (third recombined light V12), and then emitted to the first mirror 16, and the fourth transmitted light S12ab and the sixth reflected light S12ba are recombined (fourth recombined light V13), and then emitted to the second mirror 17.

The first mirror 16 reflects the first recombined light V10 to the second lens 18, and the third recombined light V12 to the fourth lens 20. The second mirror 17 reflects the second recombined light V11 to the third lens 19, and the fourth recombined light V13 to the fifth lens 21.

The second lens 18 is a condensing lens, collects the first recombined light V10, and emits the collected light to the first balanced optical detector 22. The third lens 19 is a condensing lens, collects the second recombined light V11, and emits the collected light to the first balanced optical detector 22. The fourth lens 20 is a condensing lens, collects the third recombined light V12, and emits the collected light to the second balanced optical detector 23. The fifth lens 21 is a condensing lens, collects the fourth recombined light V13, and emits the collected light to the second balanced optical detector 23.

The first balanced optical detector 22 comprises: a light receiving element which outputs an electric signal in accordance with the light intensity of the first recombined light V10; and a light receiving element which outputs an electric signal in accordance with the light intensity of the second recombined light V11 (the light receiving elements are not shown), detects equilibrium on the basis of the electric signals output from the light receiving elements, and generates a demodulated signal x. The second balanced optical detector 23 comprises: a light receiving element which outputs an electric signal in accordance with the light intensity of the third recombined light V12; and a light receiving element which outputs an electric signal in accordance with the light intensity of the fourth recombined light V13 (the light receiving elements are not shown), detects equilibrium on the basis of the electric signals output from the light receiving elements, and generates a demodulated signal y.

In this way, two Michelson interferometers to which a phase difference of $\pi/2$ is given are configured by the first lens 10, the two-split prism 11, the half-mirror 12, the first reflector 13, the phase adjusting section 14, the second reflector 15, the first mirror 16, the second mirror 17, the second lens 18, the third lens 19, the fourth lens 20, and the fifth lens 21.

Next, the operation of the thus configured demodulator of the second embodiment will be described.

The DQPSK optical signal incident from the optical fiber is converted by the first lens 10 to the parallel light S10, and emitted to the two-split prism 11. The parallel light S10 is split by the two-split prism 11, and emitted as the first split light S11 to the half-mirror 12, as the second split light S12 to the half-mirror 12.

The first split light S11 is emitted by the half-mirror 12 as the first reflected light S11a to the first reflector 13, and as the first transmitted light S11b to the second reflector 15 via the phase adjusting section 14. By contrast, the second split light S12 is emitted by the half-mirror 12 as the second reflected light S12a to the first reflector 13, and as the second transmitted light S12b to the second reflector 15 via the phase adjusting section 14.

The first reflected light S11a and the second reflected light S12a are again incident on the half-mirror 12 via the first reflector 13, and the first reflected light S11a is emitted by the half-mirror 12 as the third reflected light S11aa to the first mirror 16, and as the third transmitted light S11ab to the second mirror 17. The second reflected light S12a is emitted by the half-mirror 12 as the fourth reflected light S12aa to the first mirror 16, and as the fourth transmitted light S12ab to the second mirror 17.

The first transmitted light S11b and the second transmitted light S12b are again incident on the half-mirror 12 via the phase adjusting section 14 and the second reflector 15, and the first transmitted light S11b is emitted by the half-mirror 12 as the fifth reflected light S11ba to the second mirror 17, and as the fifth transmitted light S11bb to the first mirror 16. The second transmitted light S12b is emitted by the half-mirror 12 as the sixth reflected light S12ba to the second mirror 17, and as the sixth transmitted light S12bb to the first mirror 16.

The first transmitted light S11b has the delay time Td which is equal to a symbol period, with respect to the first reflected light S11a. Similarly, the second transmitted light S12b has the delay time Td which is equal to a symbol period, with respect to the second reflected light S12a. The phase adjusting section 14 gives a phase shift of $\pi/4$ to the first transmitted light S11b, and a phase shift of $-\pi/4$ to the second transmitted light S12b. That is, a phase difference of $\pi/2$ is provided between the first transmitted light S11b and the second transmitted light S12b.

The first mirror 16 emits the recombined light (first recombined light V10) of the third reflected light S11aa and the fifth transmitted light S11bb, to the second lens 18, and the recombined light (third recombined light V12) of the fourth reflected light S12aa and the sixth transmitted light S12bb, to the fourth lens 20. The second mirror 17 emits the recombined light (second recombined light V10) of the third transmitted light S11ab and the fifth reflected light S11ba, to the third lens 19, and the recombined light (fourth recombined light V13) of the fourth transmitted light S12ab and the sixth reflected light S12ba, to the fifth lens 21.

The first recombined light V10 and the second recombined light V11 which are collected respectively by the second lens 18 and the third lens 19 are emitted to the first balanced optical detector 22. By contrast, the third recombined light V12 and the fourth recombined light V13 which are collected respectively by the fourth lens 20 and the fifth lens 21 are emitted to the second balanced optical detector 23.

The first balanced optical detector 22 performs an equilibrium detecting process on the first recombined light V10 and the second recombined light V11, and generates the demodulated signal x. By contrast, the second balanced optical detector 23 performs an equilibrium detecting process on the third recombined light V12 and the fourth recombined light V13, and generates the demodulated signal y. The thus obtained demodulated signals x, y are signals indicative of a binary code.

The light intensity P10 of the first recombined light V10, the light intensity P11 of the second recombined light V11, the light intensity P12 of the third recombined light V12, and the light intensity P13 of the fourth recombined light V13 are expressed by following expressions (3) to (6).

[Exp. 2]

$$P10, P20 = \left|\frac{1}{2}\left(e^{-j2\pi f\left(T_d+\frac{\delta_1}{c}\right)} + e^{j0}\right)\right|^2 = \left|\frac{1}{2}\left(e^{-j2\pi f\left(T_d+\frac{\delta_1}{c}\right)} + 1\right)\right|^2 \quad (3)$$

$$P11, P21 = \left|\frac{1}{2}\left(e^{-j2\pi f\left(T_d+\frac{\delta_1}{c}\right)} - e^{j0}\right)\right|^2 = \left|\frac{1}{2}\left(e^{-j2\pi f\left(T_d+\frac{\delta_1}{c}\right)} - 1\right)\right|^2 \quad (4)$$

$$P12, P22 = \left|\frac{1}{2}\left(e^{-j2\pi f\left(T_d+\frac{\delta_1}{c}\right)} + e^{j\left(\frac{\pi}{2}+\delta_2\right)}\right)\right|^2 = \left|\frac{1}{2}\left(e^{-j2\pi f\left(T_d+\frac{\delta_1}{c}\right)} je^{j\delta_2}\right)\right|^2 \quad (5)$$

$$P13, P23 = \left|\frac{1}{2}\left(e^{-j2\pi f\left(T_d+\frac{\delta_2}{c}\right)} - e^{j\left(\frac{\pi}{2}+\delta_2\right)}\right)\right|^2 = \left|\frac{1}{2}\left(e^{-j2\pi f\left(T_d+\frac{\delta_1}{c}\right)} je^{j\delta_2}\right)\right|^2 \quad (6)$$

In the expressions (3) to (6), Td, f, c, and $\delta 1$ are identical with those of the expressions (1) and (2). Furthermore, $\delta 2$ is a parameter indicating a fine adjustment of the phase shift amount. The value of $\delta 2$ can be adjusted by applying an external force (such as stress, an electric field, or a temperature) to the phase adjusting section 14. As a result of the adjustment, the phase difference between the first transmitted light S11b and the second transmitted light S12b can be always correctly kept to $\pi/2$.

As described above, the demodulator of the second embodiment is not configured by optical waveguides as in the related art, but by the two Michelson interferometers having the discrete optical components. In the same manner as in the first embodiment, therefore, a temperature compensating structure of the delay time Td can be easily obtained by finely adjusting the X-axis direction position of the second reflector 15, and it is possible to realize a demodulator in which a highly accurate temperature control is not required. Since the temperature control is not required, the apparatus cost and size of the demodulator can be reduced.

When the optical signals output from the two Michelson interferometers are received directly by the balanced optical detectors, a delay is not generated in the optical signals.

Moreover, the phase adjusting section 14 can be easily inserted in a Michelson interferometer. Therefore, the phase difference between two Michelson interferometers can be always correctly kept to $\pi/2$ (That is, the reproducibility of the phase shift amount is high).

As described above, according to the demodulator of the second embodiment, a DQPSK optical signal can be demodulated stably and correctly.

Third Embodiment

Figure 3:
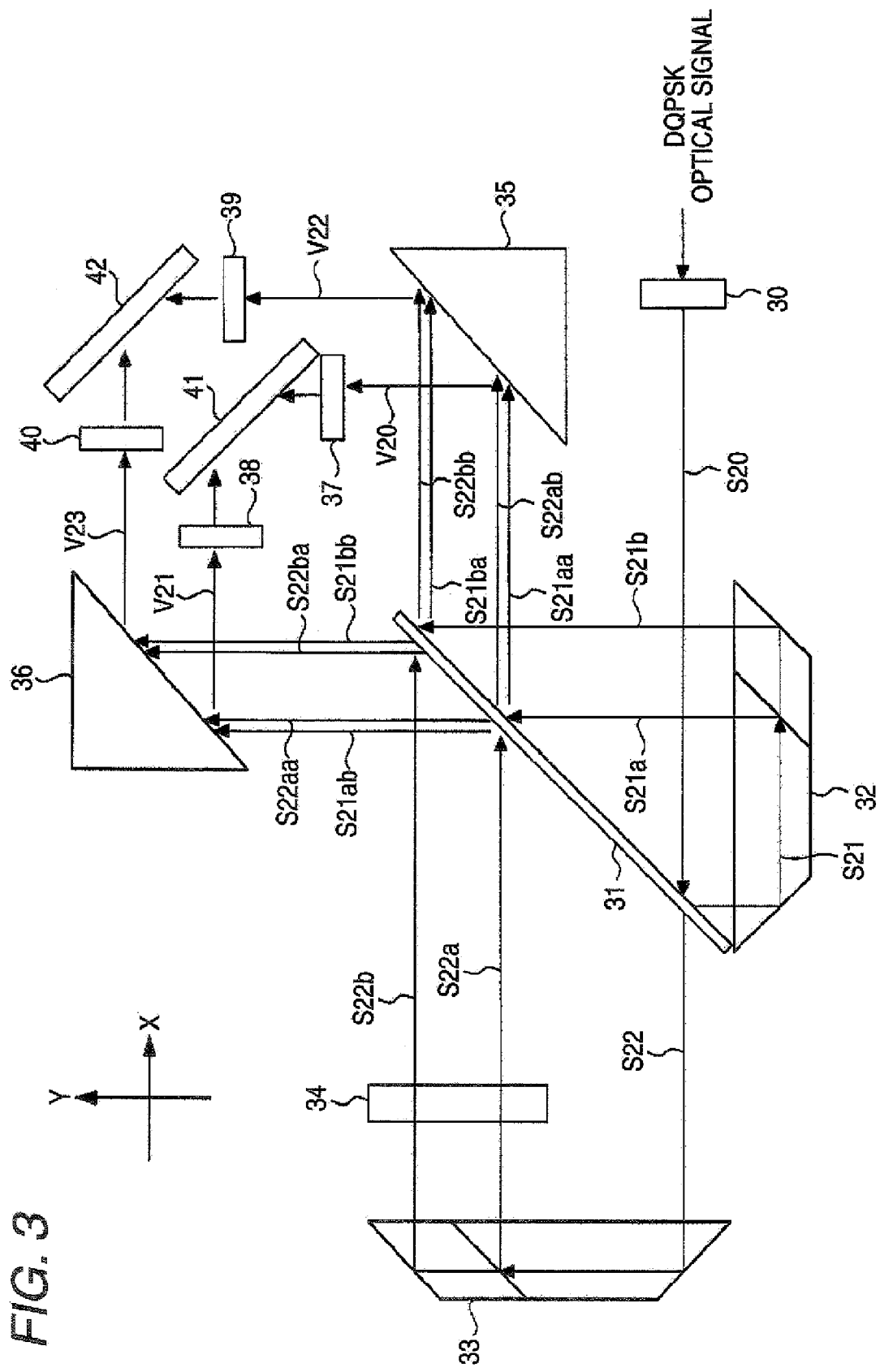
FIG. 3 is a diagram schematically showing the configuration of a demodulator of a third embodiment.

Next, a third embodiment of the invention will be described with reference to FIG. 3. FIG. 3 is a diagram schematically showing the configuration of a demodulator of the third embodiment. The demodulator of the third embodiment demodulates a DQPSK-modulated optical signal (DQPSK optical signal).

As shown in the figure, the demodulator of the third embodiment is configured by a first lens 30, a half-mirror 31, a first reflector 32, a second reflector 33, a phase adjusting section 34, a first mirror 35, a second mirror 36, a second lens 37, a third lens 38, a fourth lens 39, a fifth lens 40, a first balanced optical detector 41, and a second balanced optical detector 42.

The first lens 30 is, for example, a collimator lens, coverts a DQPSK optical signal which is incident from an optical fiber (not shown) into parallel light S20, and emits the parallel light to the half-mirror 31 disposed on the emission axis (X-axis). The half-mirror 31 reflects the parallel light S20 incident from the first lens 30, as first reflected light S21 to the first reflector 32 disposed in the Y-axis direction, and allows the light to transmit as first transmitted light S22 to the second reflector 33 disposed in the X-axis direction.

The first reflector 32 incorporates a beam splitter, reflects the first reflected light S21 incident from the half-mirror 31, in the X-axis direction, then splits the reflected light into first split light S21$a$ and second split light S21$b$, and reflects the light in the Y-axis direction, or toward the half-mirror 31. The second reflector 33 incorporates a beam splitter, reflects the first transmitted light S22 incident from the half-mirror 31, in the Y-axis direction, then splits the reflected light into third split light S22$a$ and fourth split light S22$b$, and reflects the light via the phase adjusting section 34 in the X-axis direction or toward the half-mirror 31. The second reflector 33 is disposed so as to be movable in the X-axis direction.

The optical path length difference between the optical path of the first reflected light S21+the first split light S21$a$, and that of the first transmitted light S22+the third split light S22$a$ is set so that the third split light S22$a$ has a delay time Td which is equal to a symbol period, with respect to the first split light S21$a$. Similarly, the optical path length difference between the optical path of the first reflected light S21+the second split light S21$b$, and that of the first transmitted light S22+the fourth split light S22$b$ is set so that the fourth split light S22$b$ has a delay time Td which is equal to a symbol period, with respect to the second split light S21$b$.

The phase adjusting section 34 gives a phase shift of $\pi/4$ to the third split light S22$a$, and a phase shift of $-\pi/4$ to the fourth split light S22$b$. That is, a phase difference of $\pi/2$ is provided between the third split light S22$a$ and the fourth split light S22$b$. In the same manner as the second embodiment, a combination of two optical media having different refractive indices, that of two optical media having different thicknesses, or that of two optical thin films having different optical characteristics, or the like is used as the phase adjusting section 34, thereby realizing the phase shift. The phase adjusting section 34 finely adjusts the phase shift amount by applying any external force such as stress, an electric field, or a temperature.

The half-mirror 31 reflects the first split light S21$a$ incident via the first reflector 32, as second reflected light S21$aa$ to the first mirror 35 disposed in the X-axis direction, and allows the light to transmit as second transmitted light S21$ab$ to the second mirror 36 disposed in the Y-axis direction. The half-mirror 31 reflects the second split light S21$b$ incident via the first reflector 32, as third reflected light S21$ba$ to the first mirror 35, and allows the light to transmit as third transmitted light S21$bb$ to the second mirror 36.

The half-mirror 31 reflects the third split light S22$a$ incident via the second reflector 33 and the phase adjusting section 34, as fourth reflected light S22$aa$ to the second mirror 36, and allows the light to transmit as fourth transmitted light S22$ab$ to the first mirror 35. The half-mirror 31 reflects the fourth split light S22$b$ incident via the second reflector 33 and the phase adjusting section 34, as fifth reflected light S22$ba$ to the second mirror 36, and allows the light to transmit as fifth transmitted light S22$bb$ to the first mirror 35.

That is, in the half-mirror 31, the second reflected light S21$aa$ and the fourth transmitted light S22$ab$ are recombined (first recombined light V20), and then emitted to the first mirror 35, the second transmitted light S21$ab$ and the fourth reflected light 22$aa$ are recombined (second recombined light V21), and then emitted to the second mirror 36, the third reflected light S21$ba$ and the fifth transmitted light S22$bb$ are recombined (third recombined light V22), and then emitted to the first mirror 35, and the third transmitted light S21$bb$ and the fifth reflected light S22$ba$ are recombined (fourth recombined light V23), and then emitted to the second mirror 36.

The first mirror 35 reflects the first recombined light V20 to the second lens 37, and the third recombined light V22 to the fourth lens 39. The second mirror 36 reflects the second recombined light V21 to the third lens 38, and the fourth recombined light V23 to the fifth lens 40.

The second lens 37 is a condensing lens, collects the first recombined light V20, and emits the collected light to the first balanced optical detector 41. The third lens 38 is a condensing lens, collects the second recombined light V21, and emits the collected light to the first balanced optical detector 41. The fourth lens 39 is a condensing lens, collects the third recombined light V22, and emits the collected light to the second balanced optical detector 42. The fifth lens 40 is a condensing lens, collects the fourth recombined light V23, and emits the collected light to the second balanced optical detector 42.

The first balanced optical detector 41 comprises: a light receiving element which outputs an electric signal in accordance with the light intensity of the first recombined light V20; and a light receiving element which outputs an electric signal in accordance with the light intensity of the second recombined light V21 (the light receiving elements are not shown), detects equilibrium on the basis of the electric signals output from the light receiving elements, and generates a demodulated signal x. The second balanced optical detector 42 comprises: a light receiving element which outputs an electric signal in accordance with the light intensity of the third recombined light V22; and a light receiving element which outputs an electric signal in accordance with the light intensity of the fourth recombined light V23 (the light receiving elements are not shown), detects equilibrium on the basis of the electric signals output from the light receiving elements, and generates a demodulated signal y.

In this way, two Michelson interferometers to which a phase difference of $\pi/2$ is given are configured by the first lens 30, the half-mirror 31, the first reflector 32, the second reflector 33, the phase adjusting section 34, the first mirror 35, the second mirror 36, the second lens 37, the third lens 38, the fourth lens 39, and the fifth lens 40.

Next, the operation of the thus configured demodulator of the third embodiment will be described.

The DQPSK optical signal incident from the optical fiber is converted by the first lens 30 to the parallel light S20, and emitted to the half-mirror 31. The parallel light S20 is emitted by the half-mirror 31 as the first reflected light S21 to the first reflector 32, and as the first transmitted light S22 to the second reflector 33.

The first reflected light S21 is split by the first reflector 32 into the first split light S21$a$ and the second split light S21$b$, and again incident on the half-mirror 31. By contrast, the first transmitted light S22 is split by the second reflector 33 into the third split light S22a and the fourth split light S22b, and again incident on the half-mirror 31 via the phase adjusting section 34.

The third split light S22a has a delay time Td which is equal to a symbol period, with respect to the first split light S21a. Similarly, the fourth split light S22b has a delay time Td which is equal to a symbol period, with respect to the second split light S21b. The phase adjusting section 34 gives a phase shift of $\pi/4$ to the third split light S22a, and a phase shift of $-\pi/4$ to the fourth split light S22b. That is, a phase difference of $\pi/2$ is provided between the third split light S22a and the fourth split light S22b.

In the half mirror 31, the first split light S21a incident via the first reflector 32 is emitted as the second reflected light S21aa to the first mirror 35, and as the second transmitted light S21ab to the second mirror 36. In the half mirror 31, the second split light S21b incident via the first reflector 32 is emitted as the third reflected light S21ba to the first mirror 35, and as the third transmitted light S21bb to the second mirror 36.

In the half-mirror 31, the third split light S22a incident via the second reflector 33 and the phase adjusting section 34 is emitted as the fourth reflected light S22aa to the second mirror 36, and as the fourth transmitted light S22ab to the first mirror 35. In the half-mirror 31, the fourth split light S22b incident via the second reflector 33 and the phase adjusting section 34 is emitted as the fifth reflected light S22ba to the second mirror 36, and as the fifth transmitted light S22bb to the first mirror 35.

The first mirror 35 emits the recombined light (first recombined light V20) of the second reflected light S21aa and the fourth transmitted light S22ab to the second lens 37, and the recombined light (third recombined light V22 of the third reflected light S21ba and the fifth transmitted light S22bb to the fourth lens 39. The second mirror 36 emits the recombined light (second recombined light V21) of the second transmitted light S21ab and the fourth reflected light S22aa to the third lens 38, and the recombined light (fourth recombined light V23) of the third transmitted light S21bb and the fifth reflected light S22ba to the fifth lens 40.

The first recombined light V20 and the second recombined light V21 which are collected respectively by the second lens 37 and the third lens 38 are emitted to the first balanced optical detector 41. By contrast, the third recombined light V22 and the fourth recombined light V23 which are collected respectively by the fourth lens 39 and the fifth lens 40 are emitted to the second balanced optical detector 42.

The first balanced optical detector 41 performs an equilibrium detecting process on the first recombined light V20 and the second recombined light V21, and generates the demodulated signal x. By contrast, the second balanced optical detector 42 performs an equilibrium detecting process on the third recombined light V22 and the fourth recombined light V23, and generates the demodulated signal y. The thus obtained demodulated signals x, y are signals indicative of a binary code.

The light intensity P20 of the first recombined light V20, the light intensity P21 of the second recombined light V21, the light intensity P22 of the third recombined light V22, and the light intensity P23 of the fourth recombined light V23 are expressed by the expressions (3) to (6) above in the same manner as the second embodiment.

That is, $\delta 2$ is a parameter indicating a fine adjustment of the phase shift amount. When the value of the parameter is adjusted by the phase adjusting section 34, the phase difference between the third split light S22a and the fourth split light S22b can be always correctly kept to $\pi/2$.

As described above, the demodulator of the third embodiment is not configured by optical waveguides as in the related art, but by the two Michelson interferometers having the discrete optical components. In the same manner as in the second embodiment, a temperature compensating structure of the delay time Td can be easily obtained by finely adjusting the X-axis direction position of the second reflector 33, and it is possible to realize a demodulator in which a highly accurate temperature control is not required. Since the temperature control is not required, the apparatus cost and size of the demodulator can be reduced.

When the optical signals output from the two Michelson interferometers are received directly by the balanced optical detectors, a delay is not generated in the optical signals.

Moreover, the phase adjusting section 34 can be easily inserted in a Michelson interferometer. Therefore, the phase difference between two Michelson interferometers can be always correctly kept to $\pi/2$ (That is, the reproducibility of the phase shift amount is high).

In the demodulator of the third embodiment, the configuration in which the parallel light S20 is split by the half mirror 31 into the first reflected light S21 and the first transmitted light S22, and then the reflected light and the transmitted light are further split by the first reflector 32 or the second reflector 33 is employed. According to the configuration, it is possible to reduce the apparatus size as compared with the second embodiment.

As described above, the demodulator of the third embodiment can demodulate stably and correctly a DQPSK optical signal.

The invention is not restricted to the embodiments. For example, following modifications may be employed.

(1) In the first to third embodiments, the movable mechanism of the X-axis direction is disposed in the second reflector. The invention is not restricted to this. The first reflector may be configured so as to be movable in the Y-axis direction, whereby the delay time Td may be adjusted. Alternatively, both the first and second reflectors may be configured so as to be movable. In the case where the first reflector is configured so as to be movable, a phase adjusting section may be inserted between the first reflector and the half-mirror. In the first embodiment also, a phase adjusting section for finely adjusting the delay time may be disposed between the second reflector and the half-mirror.

(2) The first to third embodiments are configured so that the optical signals output from the Michelson interferometer are received directly by the balanced optical detector. The invention is not restricted to this. Alternatively, a configuration in which the second to fifth lenses are connected to the balanced optical detector by optical fibers may be employed.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

FIG. 1 a DPSK OPTICAL SIGNAL

FIG. 2 a DQPSK OPTICAL SIGNAL

FIG. 3 a DQPSK OPTICAL SIGNAL

Figure 4:
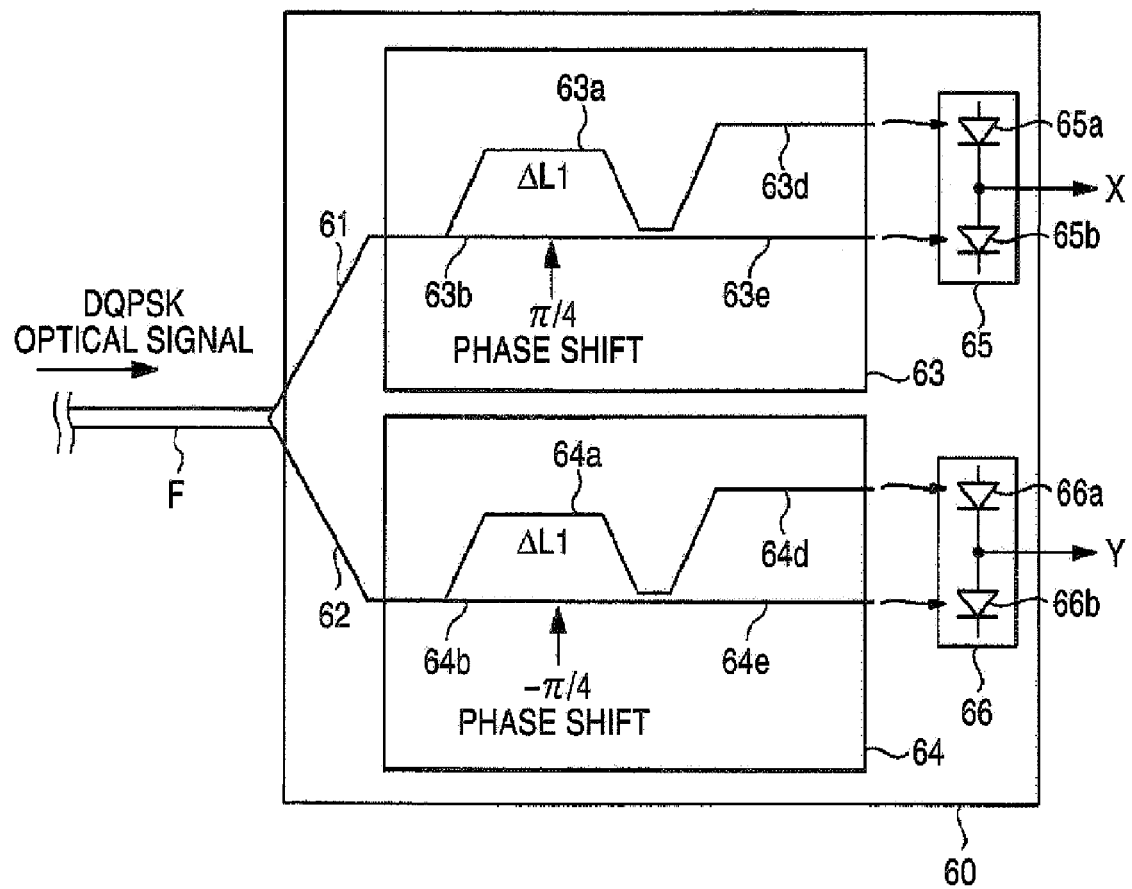
FIG. 4 is a diagram schematically showing the configuration of a related demodulator.

FIG. 4
a DQPSK OPTICAL SIGNAL
b π/4 PHASE SHIFT
c −π/4 PHASE SHIFT

What is claimed is:

1. A demodulator for demodulating an optical signal on which DPSK (Differential Phase Shift Keying) is applied, the demodulator comprising:
a Michelson interferometer that includes:
a half-mirror for splitting the optical signal into a first split light and a second split light, emitting the first split light to a first optical path, and emitting the second split light to a second optical path;
a first reflector for reflecting the first split light to the half-mirror, the first reflector being disposed on the first optical path; and
a second reflector for reflecting the second split light to the half-mirror, the second reflector being disposed on the second optical path,
wherein the half-mirror recombines the first split light incident from the first reflector and the second split light incident from the second reflector, and emits a recombined optical signal while splitting the recombined optical signal in two branches; and
a balanced optical detector that includes:
two light receiving elements for receiving the recombined optical signals being emitted in two branches from the Michelson interferometer,
wherein the balanced optical detector generates a demodulated signal based on the recombined optical signals,
wherein an optical path length difference between the first optical path and the second optical path is set so that the second split light has a delay time which is equal to a one-bit period of the optical signal, with respect to the first split light.

2. The demodulator according to claim 1, wherein at least one of the first reflector or the second reflector has a movable mechanism to adjust an optical path length of at least one of the first optical path or the second optical path.

3. The demodulator according to claim 1, wherein the Michelson interferometer further includes a phase adjusting section for adjusting the delay time, the phase adjusting section being disposed between the half-mirror and at least one of the first reflector or the second reflector.

4. The demodulator according to claim 3, wherein the phase adjusting section is a combination of two media having different refractive indices, a combination of two media having different board thicknesses, or a combination of two optical thin films having different optical characteristics.

5. The demodulator according to claim 3, wherein the phase adjusting section is an optically transparent medium in which a refractive index changes by applying an external force.

6. The demodulator according to claim 5, wherein the external force is a stress, an electric field, or a temperature.

7. The demodulator according to claim 1, wherein the Michelson interferometer and the balanced optical detector are connected by an optical fiber.

8. The demodulator according to claim 1, wherein the balanced optical detector performs an equilibrium detecting process on a first recombined light and a second recombined light, and generates the demodulated signal.

9. The demodulator according to claim 1, wherein the DPSK signal is applied to the half-mirror through a lens with full power.

10. The demodulator according to claim 1, the Michelson interferometer further includes a first mirror and second mirror, wherein a first recombined optical signal is incident on the first mirror and a second recombined optical signal is incident on the second mirror.

11. The demodulator according to claim 10, wherein the first recombined optical signal is emitted from the first mirror to the balanced optical detector through a first lens, and the second recombined optical signal is emitted from the second mirror to the balanced optical detector through a second lens.

12. A demodulator for demodulating an optical signal on which a DQPSK (Differential Quadrature Phase Shift Keying) is applied, the demodulator comprising:
a Michelson interferometer that includes:
a splitting section for splitting the optical signal into a first split light and a second split light, and emitting the first split light and the second split light;
a half-mirror which is disposed on an emission optical axis of the splitting section, the half-mirror for splitting the first split light into a third split light and a fourth split light, emitting the third split light to a first optical path, emitting the fourth split light to a second optical path, splitting the second split light into a fifth split light and a sixth split light, emitting the fifth split light to a third optical path, and emitting the sixth split light to a fourth optical path;
a first reflector for reflecting the third split light and the fifth split light to the half-mirror, the first reflector being disposed on the first optical path and the third optical path; and
a second reflector for reflecting the fourth split light and the sixth split light to the half-mirror, the second reflector being disposed on the second optical path and the fourth optical path,
wherein the half-mirror recombines the third split light incident from the first reflector and the fourth split light incident from the second reflector, and emits a first recombined optical signal while splitting the first recombined optical signal in two branches, and
the half-mirror recombines the fifth split light incident from the first reflector and the sixth split light incident from the second reflector, and emits a second recombined optical signal while splitting the second recombined optical signal in two branches;
a first balanced optical detector that includes:
two light receiving elements for receiving the first recombined optical signals being emitted in two branches from the Michelson interferometer,
wherein the first balanced optical detector generates a first demodulated signal based on the first recombined optical signals; and
a second balanced optical detector that includes:
two light receiving elements for receiving the second recombined optical signals being emitted in two branches from the Michelson interferometer,
wherein the second balanced optical detector generates a second demodulated signal based on the second recombined optical signals,
wherein an optical path length difference between the first optical path and the second optical path is set so that the fourth split light has a delay time which is equal to a symbol period of the optical signal, with respect to the third split light,
an optical path length difference between the third optical path and the fourth optical path is set so that the sixth split light has a delay time which is equal to a symbol period of the optical signal, with respect to the fifth split light, and
the Michelson interferometer further includes a phase adjusting section for setting a phase difference between the first recombined optical signal and the second recombined optical signal to $\pi/2$, the phase adjusting section being disposed between the half-mirror and at least one of the first reflector or the second reflector.

13. The demodulator according to claim 12, wherein at least one of the first reflector or the second reflector has a movable mechanism to adjust an optical path length of any one of the first to fourth optical paths.

14. The demodulator according to claim 12, wherein the phase adjusting section is a combination of two media having different refractive indices, a combination of two media having different board thicknesses, or a combination of two optical thin films having different optical characteristics.

15. The demodulator according to claim 12, wherein the phase adjusting section is an optically transparent medium in which a refractive index changes by applying an external force.

16. The demodulator according to claim 15, wherein the external force is a stress, an electric field, or a temperature.

17. The demodulator according to claim 12, wherein at least one of the Michelson interferometer and the first balanced optical detector, or the Michelson interferometer and the second balanced optical detector are connected by an optical fiber.

18. The demodulator according to claim 12, wherein the splitting section for splitting the optical signal into the first split light and a second split light, and emitting the first split light and the second split light is a two-split prism.

19. The demodulator according to claim 12, the Michelson interferometer further includes a first mirror and second mirror, wherein a first and third recombined optical signals are incident on the first mirror and a second and fourth recombined optical signals are incident on the second mirror.

20. The demodulator according to claim 19, wherein the optical signal first goes through a first lens before incident on the splitting section;
   wherein the first mirror reflects the first recombined signal to the first balance detector through a second lens, and the third recombined signal to the second balanced detector through a fourth lens; and
   wherein the second mirror reflects the second recombined signal to the first balanced detector through a third lens, and the fourth recombined signal to the second balanced detector through a fifth lens.

21. The demodulator according to claim 12, wherein the first balanced optical detector detects equilibrium on the basis of electric signals output from the light receiving elements receiving the first recombined optical signals, and generates the first demodulated signal; and
   wherein the second balanced optical detector detects equilibrium on the basis of electric signals output from the light receiving elements receiving the second recombined optical signal, and generates the second demodulated signal.

22. A demodulator for demodulating an optical signal on which a DQPSK (Differential Quadrature Phase Shift Keying) is applied, the demodulator comprising:
   a Michelson interferometer that includes:
   a half-mirror for splitting the optical signal into a first split light and a second split light;
   a first reflector for reflecting the first split light to the half-mirror while splitting the first split light into a third split light and a fourth split light; and
   a second reflector for reflecting the second split light into the half-mirror while splitting the second split light into a fifth split light and a sixth split light,
   wherein the half-mirror recombines the third split light incident from the first reflector and the fifth split light incident from the second reflector, and emits a first recombined optical signal while splitting the first recombined optical signal in two branches, and
   the half-mirror recombines the fourth split light incident from the first reflector and the sixth split light incident from the second reflector, and emits a second recombined optical signal while splitting the second recombined optical signal in two branches;
   a first balanced optical detector that includes:
   two light receiving elements for receiving the first recombined optical signals being emitted in two branches from the Michelson interferometer,
   wherein the first balanced optical detector generates a first demodulated signal based on the first recombined optical signals; and
   a second balanced optical detector that includes:
   two light receiving elements for receiving the second recombined optical signals being emitted in two branches from the Michelson interferometer,
   wherein the second balanced optical detector generates a second demodulated signal based on the second recombined optical signals,
      wherein an optical path length difference between a first optical path through which the first split light and the third split light pass and a second optical path through which the second split light and the fifth split light pass is set so that the fifth split light has a delay time which is equal to a symbol period of the optical signal, with respect to the third split light,
      an optical path length difference between a third optical path through which the first split light and the fourth split light pass and a fourth optical path through which the second split light and the sixth split light pass is set so that the sixth split light has a delay time which is equal to a symbol period of the optical signal, with respect to the fourth split light, and
      the Michelson interferometer further includes a phase adjusting section for setting a phase difference between the first recombined optical signal and the second recombined optical signal to $\pi/2$, the phase adjusting section being disposed between the half-mirror and at least one of the first reflector or the second reflector.

23. The demodulator according to claim 22, wherein at least one of the first reflector or the second reflector has a movable mechanism to adjust an optical path length of any one of the first to fourth optical paths.

24. The demodulator according to claim 22, wherein the phase adjusting section is a combination of two media having different refractive indices, a combination of two media having different board thicknesses, or a combination of two optical thin films having different optical characteristics.

25. The demodulator according to claim 22, wherein the phase adjusting section is an optically transparent medium in which a refractive index changes by applying an external force.

26. The demodulator according to claim 25, wherein the external force is a stress, an electric field, or a temperature.

27. The demodulator according to claim 22, wherein at least one of the Michelson interferometer and the first balanced optical detector, or the Michelson interferometer and the second balanced optical detector are connected by an optical fiber.

* * * * *